US011734165B1

(12) United States Patent
Schreiber (10) Patent No.: US 11,734,165 B1
(45) Date of Patent: Aug. 22, 2023

(54) AUTOMATED VERIFICATION OF VISUAL USER INTERFACE CHANGES IN SOFTWARE APPLICATIONS

(71) Applicant: FMR LLC, Boston, MA (US)

(72) Inventor: Scott Schreiber, Arvada, CO (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/105,523

(22) Filed: Feb. 3, 2023

Related U.S. Application Data

(60) Provisional application No. 63/306,861, filed on Feb. 4, 2022.

(51) Int. Cl.
*G06F 11/36* (2006.01)

(52) U.S. Cl.
CPC ...... *G06F 11/3688* (2013.01); *G06F 11/3664* (2013.01)

(58) Field of Classification Search
None
See application file for complete search history.

(56) References Cited

U.S. PATENT DOCUMENTS

| 10,204,092 | B2* | 2/2019 | Venkataraman | G06F 40/174 |
| 10,324,828 | B2* | 6/2019 | Shtuchkin | G06F 11/3688 |
| 11,080,177 | B1* | 8/2021 | Schaude | G06F 11/326 |
| 2015/0082280 | A1* | 3/2015 | Betak | G06F 11/3692 717/124 |
| 2016/0321170 | A1* | 11/2016 | Ellis | G06F 11/3692 |
| 2018/0107580 | A1* | 4/2018 | Zhang | G06V 30/40 |
| 2018/0174330 | A1* | 6/2018 | Chen | G06F 8/20 |
| 2021/0141712 | A1* | 5/2021 | Gevorkyan | G06F 16/22 |
| 2021/0390041 | A1* | 12/2021 | Rajamanickam | G06F 11/3692 |
| 2022/0222549 | A1* | 7/2022 | Dundigalla | G06F 11/3688 |

OTHER PUBLICATIONS

Jung, "An Image Comparing-based GUI Software Testing Automation System", 2012, Proceedings of the International Conference on Software Engineering Research and Practice (SERP) (Year: 2012).*

* cited by examiner

*Primary Examiner* — Hossain M Morshed
(74) *Attorney, Agent, or Firm* — Cesari & McKenna, LLP (57) ABSTRACT

Methods and apparatuses for automated verification of visual user interface (UI) changes include a computing device that receives a baseline test report comprising a plurality of test steps associated with execution of a test against a software application. The computing device receives a recent test report comprising a plurality of test steps associated with execution of a test against the software application. The computing device matches each test step of the baseline report with a corresponding test step of the recent report. For each pair of matched steps, the computing device compares a first UI screenshot captured during execution the baseline report to a second UI screenshot captured during execution of the recent report. The computing device determines differences between the first UI screenshot and the second UI screenshot, generates a differential image based upon the differences, and stores the differential image in a data store.

20 Claims, 5 Drawing Sheets

AUTOMATED VERIFICATION OF VISUAL USER INTERFACE CHANGES IN SOFTWARE APPLICATIONS

RELATED APPLICATIONS

This application claims priority to U.S. Provisional Patent Application No. 63/306,861, filed on Feb. 4, 2022, the entirety of which is incorporated herein by reference.

TECHNICAL FIELD

This application relates generally to methods and apparatuses, including computer program products, for automated verification of visual user interface (UI) changes in software applications.

BACKGROUND

In modern software development, user interfaces (UIs) are continually altered to add features, assist a wider range of users, and offer a more visually and contextually appealing experience. To assist with this, specific development teams are usually assembled to standardize and stabilize UI components across the entire application ecosystem. From a technology standpoint, Angular (available at angular.io) is often chosen as a rich, scalable front-end language to build next-generation UIs. In addition, common UI components can be leveraged by application teams to streamline the development process and offer a specific look and feel that is desired across application platforms.

While scalable front-end platforms like Angular and common, cross-platform UI components increase the quality of applications, these technical features do require maintenance (e.g., version updates, library changes, etc.), and the byproducts are often minute, visual changes to UI elements. Because these byproducts are mostly visual, the document object model (DOM) remains the same and existing automation testing tools can locate the elements regardless of if they have moved inappropriately. However, testing these changes is often an organization-wide, distributed, manual effort that often results in over-testing where tests may be run multiple times to detect the same visual changes and there may not be sufficient automated processes and tools available to quickly detect such changes.

SUMMARY

Therefore, what is needed are improved methods and systems to leverage existing test reports and UI screenshots generated from testing on baseline versions of a software application and development versions of the software application to quickly identify visual differences and discrepancies in the development application user interface. The techniques described herein advantageously increase the efficiency with which testing personnel can analyze user interface changes and errors, rather than relying on exhaustive manual review of these interfaces.

The invention, in one aspect, features a computer system for automated verification of visual user interface (UI) changes. The system comprises a computing device having a memory that stores computer-executable instructions and a processor that executes the computer-executable instructions. The computing device receives a baseline test report associated with execution of a test against a software application, the baseline test report comprising a plurality of test steps. The computing device receives a recent test report associated with execution of a test against the software application, the recent test report comprising a plurality of test steps. The computing device matches each test step of the baseline test report with a corresponding test step of the recent test report. For each pair of matched test steps, the computing device compares a first user interface screenshot captured during execution of the test step of the baseline test report to a second user interface screenshot captured during execution of the test step of the recent test report. The computing device determines one or more differences between the first user interface screenshot and the second user interface screenshot. The computing device generates a differential image based upon the one or more differences between the first user interface screenshot and the second user interface screenshot. The computing device stores the differential image in a data store.

The invention, in another aspect, features a computerized method of automated verification of visual user interface (UI) changes. A computing device receives a baseline test report associated with execution of a test against a software application, the baseline test report comprising a plurality of test steps. The computing device receives a recent test report associated with execution of a test against the software application, the recent test report comprising a plurality of test steps. The computing device matches each test step of the baseline test report with a corresponding test step of the recent test report. For each pair of matched test steps, the computing device compares a first user interface screenshot captured during execution of the test step of the baseline test report to a second user interface screenshot captured during execution of the test step of the recent test report. The computing device determines one or more differences between the first user interface screenshot and the second user interface screenshot. The computing device generates a differential image based upon the one or more differences between the first user interface screenshot and the second user interface screenshot. The computing device stores the differential image in a data store.

Any of the above aspects can include one or more of the following features. In some embodiments, matching each test step of the baseline test report with a corresponding test step of the recent test report comprises converting each test step of the baseline test report into one or more objects, converting each test step of the recent test report into one or more objects, and comparing the objects for each test step of the baseline test report to the corresponding objects for each test step of the recent test report. In some embodiments, the computing device generates a screenshot map based upon the object comparison.

In some embodiments, comparing a first user interface screenshot captured during execution of the test step of the baseline test report to a second user interface screenshot captured during execution of the test step of the recent test report comprises comparing each pixel of the first user interface screenshot to a corresponding pixel of the second user interface screenshot. In some embodiments, comparing each pixel of the first user interface screenshot to a corresponding pixel of the second user interface screenshot comprises comparing a color value of the pixel of the first user interface screenshot to a color value of the corresponding pixel of the second user interface screenshot. In some embodiments, comparing each pixel of the first user interface screenshot to a corresponding pixel of the second user interface screenshot comprises comparing a location of the pixel of the first user interface screenshot to a location of the corresponding pixel of the second user interface screenshot. In some embodiments, determining one or more differences between the first user interface screenshot and the second user interface screenshot comprises identifying one or more pixels in the second user interface screenshot where the color value does not match the color value of the corresponding pixel in the first user interface screenshot. In some embodiments, the computing device generates the differential image when a count of the identified pixels in the second user interface screenshot is above a predetermined threshold. In some embodiments, the computing device does not generate the differential image when a count of the identified pixels in the second user interface screenshot is at or below a predetermined threshold. In some embodiments, the differential image comprises one or more highlighted areas corresponding to the one or more differences between the first user interface screenshot and the second user interface screenshot.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
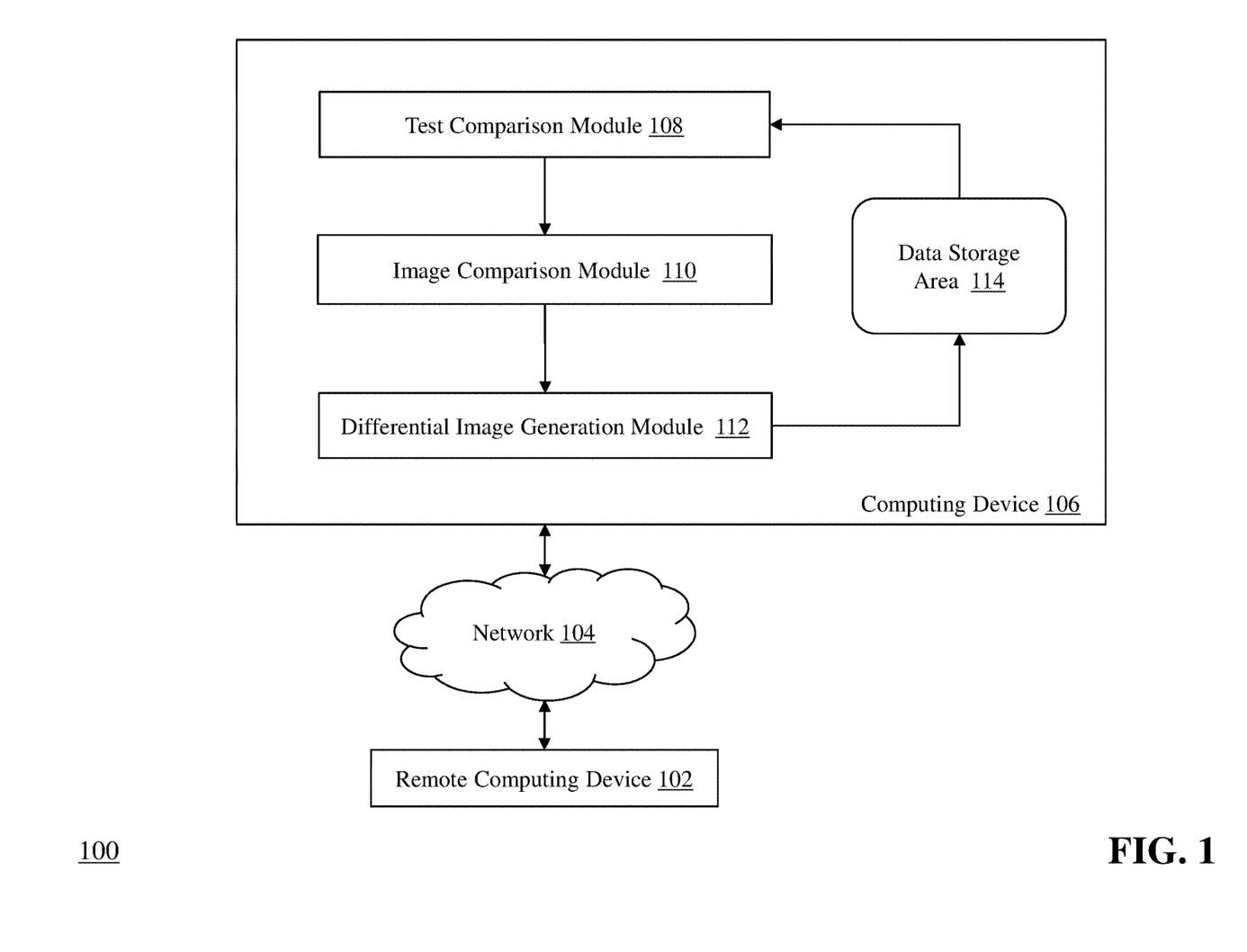
FIG. 1 is a block diagram of a system for automated verification of visual user interface (UI) changes.

FIG. 1 is a block diagram of a system 100 for automated verification of visual user interface (UI) changes. The system 100 includes a remote computing device 102, a communications network 104, a computing device 106 that includes a test comparison module 108, an image comparison module 110, a differential image generation module 112, and a data storage area 114.

The remote computing device 102 connects to one or more communications networks (e.g., network 104) in order to communicate with the computing device 106 to provide input and receive output relating to automated verification of visual user interface (UI) changes as described herein. Exemplary remote computing devices 102 include but are not limited to server computing devices, desktop computers, laptop computers, tablets, mobile devices, smartphones, and the like. It should be appreciated that other types of computing devices that are capable of connecting to the components of the system 100 can be used without departing from the scope of invention. Although FIG. 1 depicts one remote computing device 102, it should be appreciated that the system 100 can include any number of remote computing devices.

The communications network 104 enables the remote computing device 102 to communicate with the computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The computing device 106 is a device including specialized hardware and/or software modules that execute on a processor and interact with memory modules of the computing device 106, to receive data from other components of the system 100, transmit data to other components of the system 100, and perform functions for providing automated verification of visual user interface (UI) changes as described herein. Exemplary computing devices 106 include but are not limited to desktop computers, laptop computers, tablets, mobile devices, smartphones, and the like. The computing device 106 includes a test comparison module 108, an image comparison module 110, and a differential image generation module 112 that execute on the processor of the computing device 106. In some embodiments, the modules 108, 110, 112 are specialized sets of computer software instructions programmed onto one or more dedicated processors in the computing device.

Although the modules 108, 110, 112 are shown in FIG. 1 as executing within the same computing device 106, in some embodiments the functionality of the modules 108, 110, 112 can be distributed among one or a plurality of other computing devices that are coupled to the computing device 106. As shown in FIG. 1, the computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the applications 108, 110 and event manager 112 will be described in greater detail throughout this specification.

The data storage area 114 is a memory location resident on computing device 106 (or in some embodiments, one or more other computing devices). The data storage area 114 is configured to receive, generate, and store specific segments of data—including but not limited to test reports, objects, screenshots, and/or differential images—relating to the process of automated verification of visual user interface (UI) changes as described herein.

Figure 2:
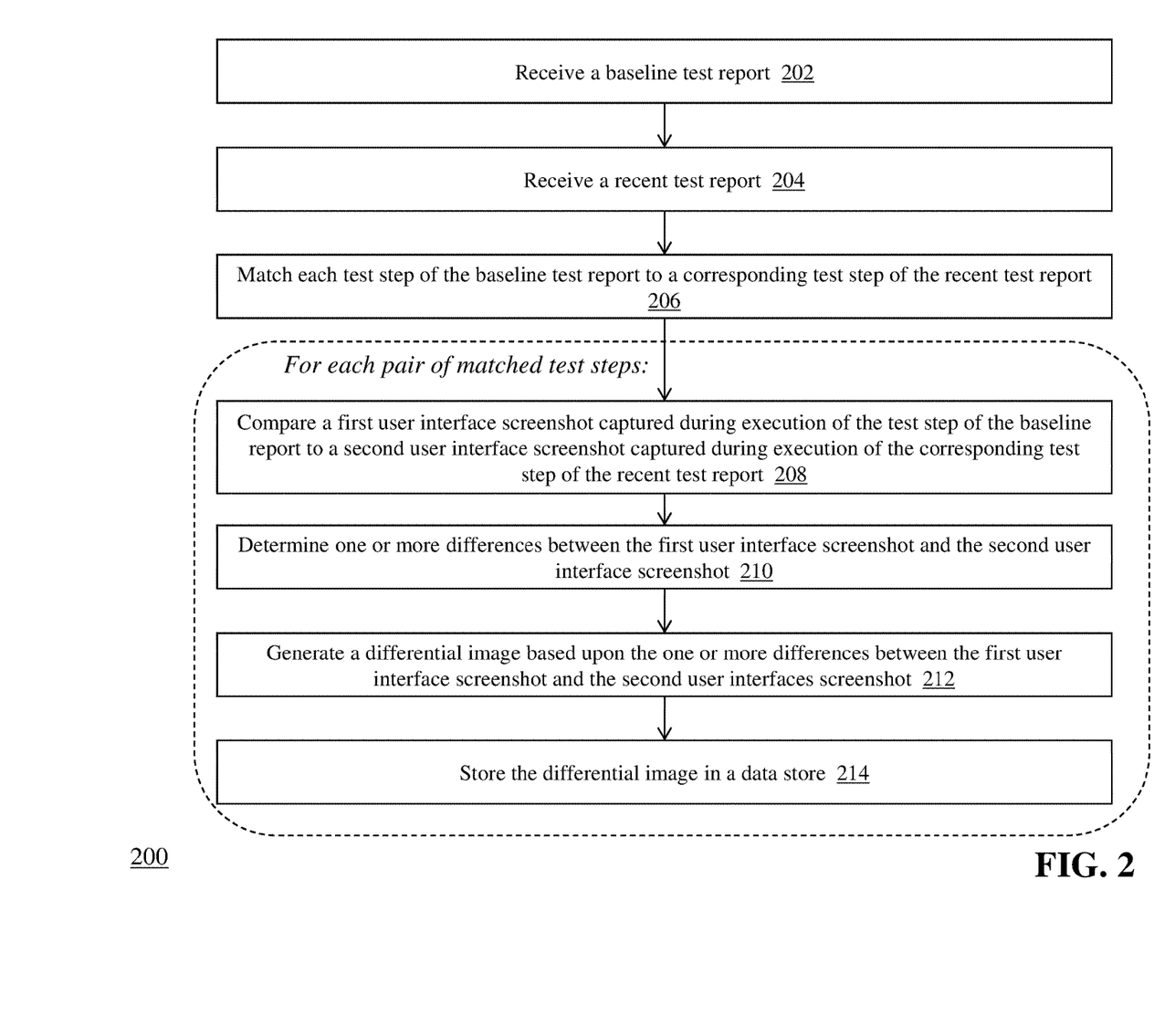
FIG. 2 is a flow diagram of a computerized method of automated verification of visual user interface (UI) changes.

FIG. 2 is a flow diagram of a computerized method 200 of automated verification of visual user interface (UI) changes, using the system 100 of FIG. 1. The test comparison module 108 of computing device 106 receives (step 202) a baseline test report for a test executed against a software application and receives (step 204) a recent test report for a test executed against the software application. As an example, the baseline test report can be associated with execution of a test against a version of the software application that has been verified as working properly (e.g., ready for production deployment)—while the recent test report can be associated with execution of the same test against a version of the software application that is under development and needs to be evaluated.

In some embodiments, the test comparison module 108 retrieves the baseline test report and the recent test report from data storage area 114. For example, the test comparison module 108 can be configured to periodically scan a folder location in test storage area 114 for a certain type of test report file (e.g., JSON reports generated by the Serenity BDD™ testing framework (available at serenity-bdd.info)) associated with the baseline test execution and/or the recent test execution. Generally, the test report file comprises structured data and metadata about each of the specific test steps carried out during execution of the test, such as test step number, test step description, test step duration, and test step result. For certain test steps, the test system may have captured a screenshot of the user interface during execution of the test step and the test report file can contain a reference to the screenshot file name and a time stamp of when the screenshot was taken. In some embodiments, the test comparison module 108 locates the desired test report file based on a unique hash associated with the test execution (e.g., the hash can be the file name for the report or otherwise associated with the report). When the test comparison module 108 locates the baseline test report and recent test report, the module 108 can move and/or copy the test reports to a temporary storage location used by the module 108.

Figure 3:
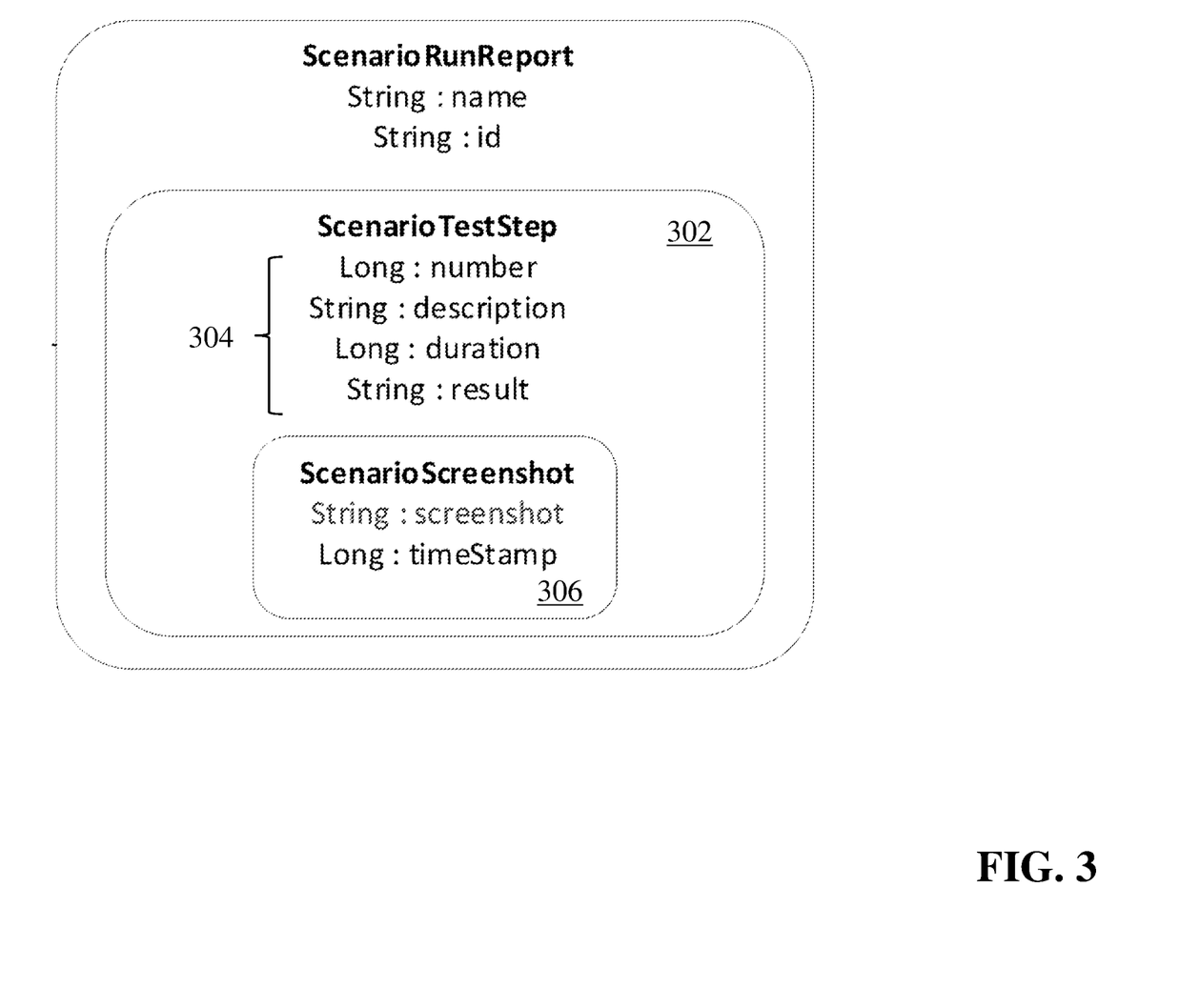
FIG. 3 is a diagram of an exemplary object structure used by the test comparison module.

The test comparison module 108 matches (step 206) each test step of the baseline test report to a corresponding test step of the recent test report. In order to ensure that the steps of the two test reports are the same, the module 108 compares the steps and confirms that they match. In some embodiments, the test comparison module 108 converts the data and metadata associated with each test step into one or more objects that enable a more efficient comparison by the module 108. FIG. 3 is a diagram of an exemplary object structure used by the module 108. As shown in FIG. 3, each test step is converted into an object 302 (ScenarioTestStep) that includes several variables 304 for certain data elements for the test step. Each test step object includes a screenshot object 306 (ScenarioScreenshot) which includes a string variable (screenshot) referencing an image file (e.g., PNG file) of a user interface screenshot captured by the test system during execution of the test step and a long variable (timeStamp) containing a timestamp of when the screenshot was captured. For example, the screenshot image file can comprise a view of the graphical user interface of the application under test during the corresponding test step.

Figure 4:
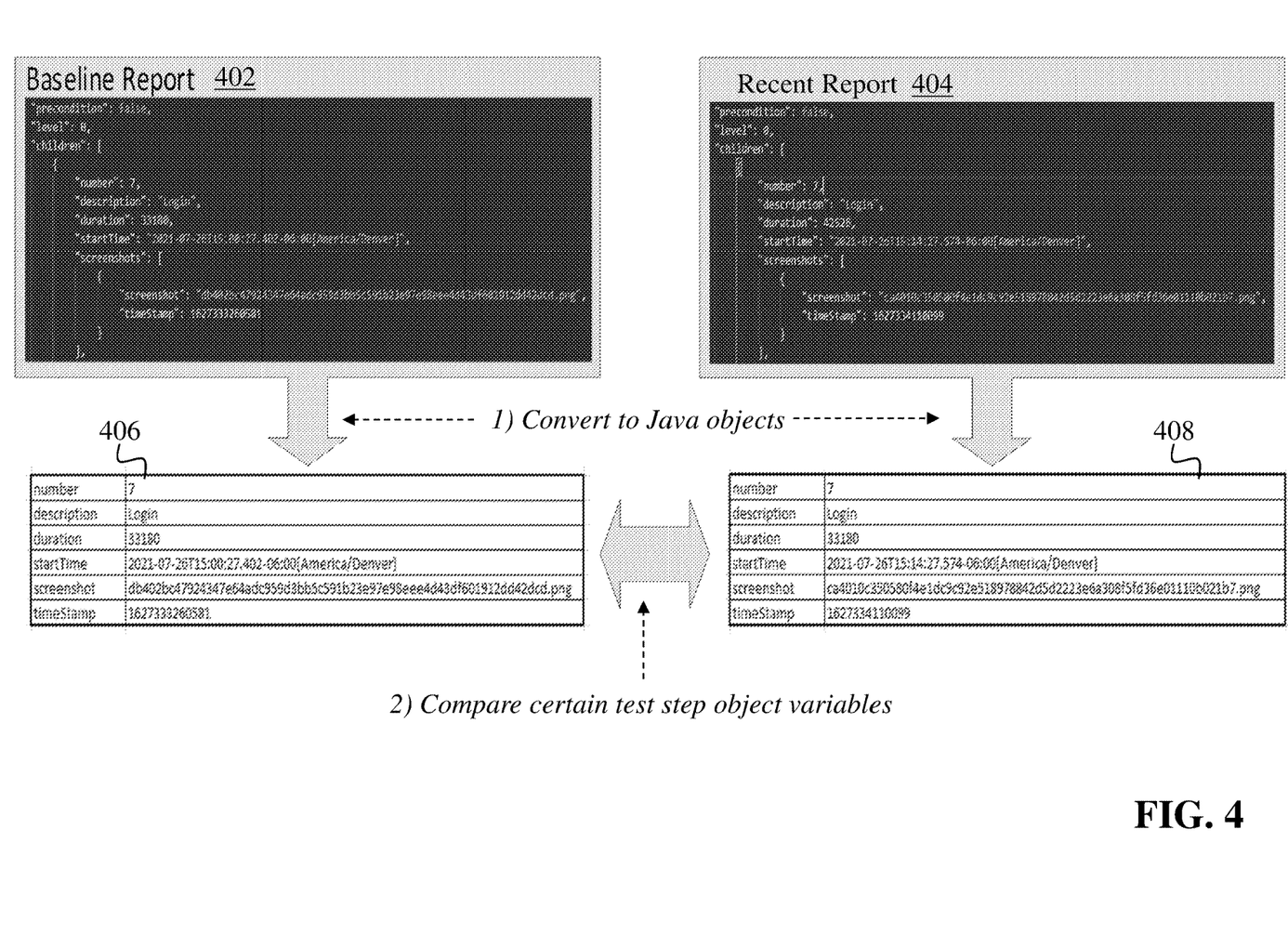
FIG. 4 is a workflow diagram of an exemplary test step comparison performed by the test comparison module.

The test comparison module 108 can compare each variable of the ScenarioTestStep object 302 and each variable of the ScenarioScreenshot object 306 from the baseline test report to the corresponding object variables from the recent test report, in order to determine whether the two steps are the same. FIG. 4 is a workflow diagram of an exemplary test step comparison performed by the test comparison module 108. As shown in FIG. 4, the baseline report 402 and recent report 404 comprise structured data (JSON) corresponding to each test step performed during the test execution. The test execution module 108 converts the structured data for each test step into Java objects (represented as tables 406, 408 respectively) and compares the variables in the baseline Java objects 406 to the corresponding variables in the recent Java objects 408 to determine whether the test step object variables match (i.e., number, description, duration). It should be appreciated that certain test step object variables (e.g., startTime) and screenshot object variables (e.g., screenshot, timeStamp) are not typically compared for matching because these variables are necessarily going to be different—e.g., no two screenshots will be assigned the same filename or hash value, etc.

Once the test steps are matched between the baseline test report and the recent test report, the image comparison module 110 compares (step 208), for each applicable test step, the user interface screenshot image captured during execution of the test step in the baseline test report to the user interface screenshot image captured during execution of the corresponding test step in the recent test report. Because the test steps have been confirmed to be the same by the test comparison module 108, the user interface screenshots from those steps should also be the same. When the screenshot associated with the test step in the recent test report contains differences from the screenshot associated with the corresponding test step in the baseline test report, it may indicate bugs or errors in the version of the software application that is being tested. In some embodiments, the module can pre-process the screenshot images (e.g., crop, resize, etc.) in order to ensure that the two images have the same dimensions, resolution, and the like before starting the comparison.

In some embodiments, the module 110 performs a pixel-by-pixel comparison of the respective screenshot images to determine whether the screenshot image associated with the test step in the recent test report contains any differences from the screenshot image associated with the test step in the baseline test report. For example, the module 110 can utilize the AShot image comparison Java library (available at github.com/pazone/ashot) to perform the image comparison. For the pixel-by-pixel comparison, the module 110 can identify a location (e.g., x-y coordinates) of a first pixel in the first user interface screenshot from the baseline test and extract the color value (e.g., RGB value) for that pixel. Then, the module 110 can locate the corresponding pixel in the second user interface screenshot from the recent test using the x-y coordinates, and extract the color value for that pixel. Finally, the module 110 can compare the color value for the first pixel to the color value for the corresponding pixel. If the color values are the same, the module 110 considers the pixels to match. If the color values are different, the module 110 considers the pixels a non-match. The module 110 continues the pixel-by-pixel comparison for each pixel in the images.

During or after the image comparison, the image comparison module 110 determines (step 210) one or more differences between the first user interface screenshot image from the baseline test report and the second user interface screenshot image from the recent test report. As mentioned above, the module 110 can determine how many pixels match and/or how many pixels do not match, and further identify the location(s) of the mismatched pixels as well as a difference in color value between the two mismatched pixels. In some embodiments, the image comparison module 110 stores the data associated with the differences (e.g., pixel location, color value of first pixel, color value of second pixel, difference in color values, etc.) in data storage area 114.

When one or more differences between the first user interface screenshot image and the second user interface screenshot image are determined by the image comparison module 110, the differential image generation module 112 generates (step 212) a differential image based upon the one or more differences. In some embodiments, the module 112 generates the differential image by identifying the location(s) of the mismatched pixels in the second user interface screenshot image (from the recent test), determining a difference color value by, e.g., subtracting the color value for the mismatched pixel in the second user interface screenshot image from the color value for the corresponding pixel in the first user interface screenshot image, then replacing the original color value of the mismatched pixel with the difference color value and generating a new image. It should be appreciated that other techniques or algorithms for generating a differential image can be used without departing from the scope of technology described herein.

Figure 5:
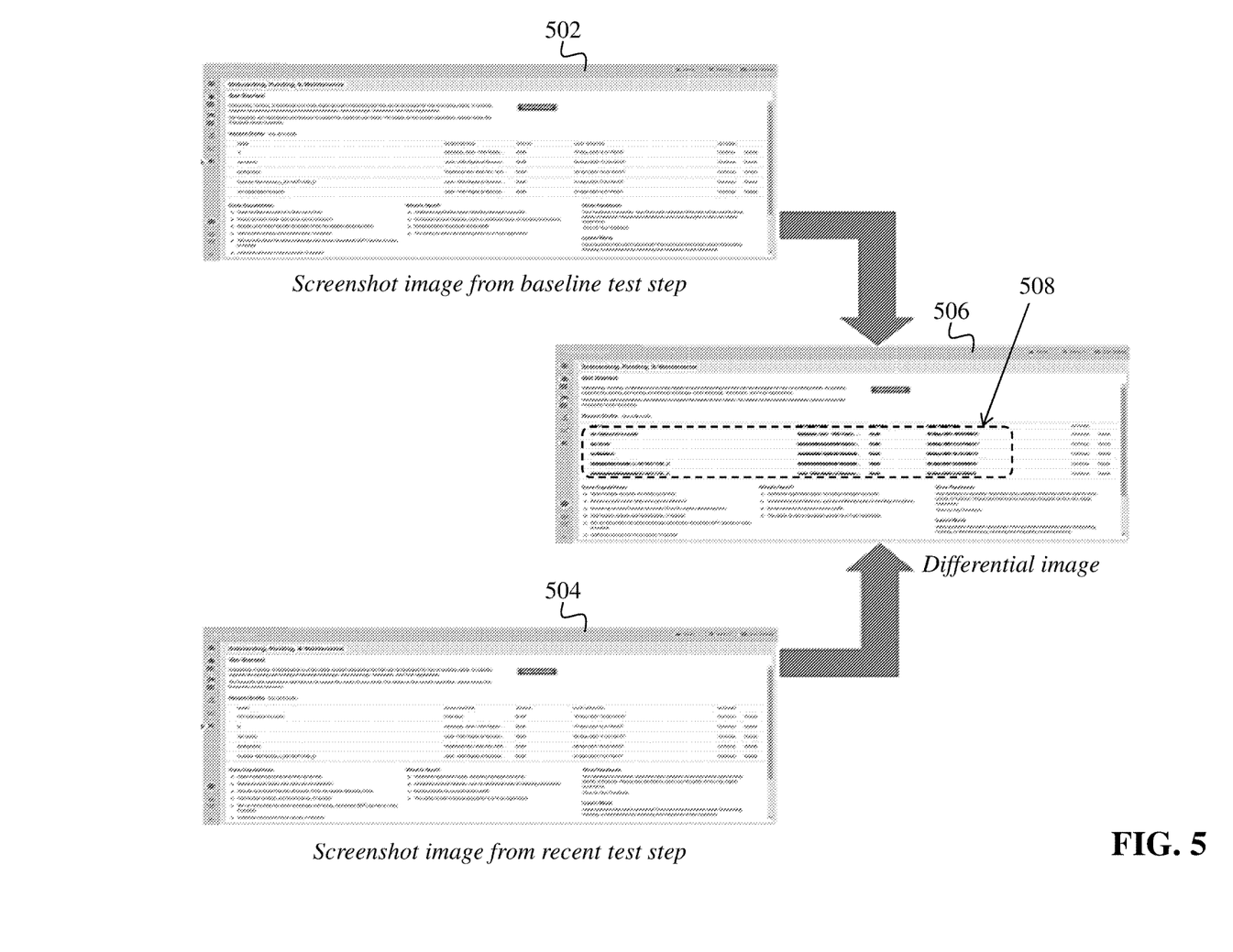
FIG. 5 is a workflow diagram of an exemplary differential image generation process performed by the differential image generation module.

The differential image generation module 112 can highlight and/or annotate the differential image according to the identified pixel mismatches. FIG. 5 is a workflow diagram of an exemplary differential image generation process performed by the differential image generation module 112. As shown in FIG. 5, the module 112 compares the pixels of the screenshot image 502 from the baseline test step to the pixels of the screenshot image 504 from the recent test step. The module 112 generates the differential image 506 as described above, and highlights certain portions of the differential image where the mismatched pixels are located (such as area 508). The differential image generation module 112 stores (step 214) the differential image in, e.g., data storage area 114. In some embodiments, the differential image is stored alongside the first user interface screenshot and the second user interface screenshot.

In some embodiments, the differential image generation module 112 can apply a threshold tolerance during the pixel comparison process to allow for minor variations between the two images that should not be categorized as substantive differences. For example, in some cases, the user interface may comprise a dynamically generated number that is different each time the user interface is generated and displayed. For testing purposes, it may not be relevant that this number is different as testers may be more interested in anomalies that disrupt or negatively impact the layout or design of the user interface (e.g., missing sections, missing text, color changes, alignment errors, etc.). But, in this example, a strict pixel-by-pixel comparison of two screenshots would always generate a differential image highlighting the different numbers—even when the remainder of the user interface is the same. Therefore, the differential image generation module 112 can be configured to receive a threshold value (e.g., a percentage value) as an input argument during execution of the image comparison, where the threshold value is used to calculate how many pixels of the second user interface screenshot image (from the recent test) are allowed to be different from the pixels of the first user interface screenshot image. For example, the module 112 can calculate this value as:

(total pixels in image*threshold value)=allowed number of pixel mismatches

This approach beneficially addresses slight differences in the screenshots. For the example above, a threshold set at 1% would account for the difference in the dynamically generated number but still result in the images being considered the same. In cases where the number of mismatched pixels does not reach the threshold value, the module 112 does not generate a differential image. In some embodiments, the module 112 can be configured to recognize defined areas of the screenshot images that should be ignored when performing the pixel comparison, so that only true actionable differences between the two screenshots result in generation of a differential image.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for automated verification of visual user interface (UI) changes, the system comprising a computing device having a memory that stores computer-executable instructions and a processor that executes the computer-executable instructions to:
   receive a baseline test report associated with execution of a test against a software application, the baseline test report comprising a plurality of test steps;
   receive a recent test report associated with execution of a test against the software application, the recent test report comprising a plurality of test steps;
   match each test step of the baseline test report with a corresponding test step of the recent test report;
   for each pair of matched test steps:
   compare a first user interface screenshot captured during execution of the test step of the baseline test report to a second user interface screenshot captured during execution of the test step of the recent test report;
   determine one or more differences between the first user interface screenshot and the second user interface screenshot;
   generate a differential image based upon the one or more differences between the first user interface screenshot and the second user interface screenshot; and
   store the differential image in a data store.

2. The system of claim 1, wherein matching each test step of the baseline test report with a corresponding test step of the recent test report comprises:
   converting each test step of the baseline test report into one or more objects;
   converting each test step of the recent test report into one or more objects; and
   comparing the objects for each test step of the baseline test report to the corresponding objects for each test step of the recent test report.

3. The system of claim 2, wherein the computing device generates a screenshot map based upon the object comparison.

4. The system of claim 1, wherein comparing a first user interface screenshot captured during execution of the test step of the baseline test report to a second user interface screenshot captured during execution of the test step of the recent test report comprises:
   comparing each pixel of the first user interface screenshot to a corresponding pixel of the second user interface screenshot.

5. The system of claim 4, wherein comparing each pixel of the first user interface screenshot to a corresponding pixel of the second user interface screenshot comprises:
   comparing a color value of the pixel of the first user interface screenshot to a color value of the corresponding pixel of the second user interface screenshot.

6. The system of claim 5, wherein comparing each pixel of the first user interface screenshot to a corresponding pixel of the second user interface screenshot comprises:

comparing a location of the pixel of the first user interface screenshot to a location of the corresponding pixel of the second user interface screenshot.

7. The system of claim 6, wherein determining one or more differences between the first user interface screenshot and the second user interface screenshot comprises:
identifying one or more pixels in the second user interface screenshot where the color value does not match the color value of the corresponding pixel in the first user interface screenshot.

8. The system of claim 7, wherein the computing device generates the differential image when a count of the identified pixels in the second user interface screenshot is above a predetermined threshold.

9. The system of claim 7, wherein the computing device does not generate the differential image when a count of the identified pixels in the second user interface screenshot is at or below a predetermined threshold.

10. The system of claim 1, wherein the differential image comprises one or more highlighted areas corresponding to the one or more differences between the first user interface screenshot and the second user interface screenshot.

11. A computerized method of automated verification of visual user interface (UI) changes, the method comprising:
receiving, by a computing device, a baseline test report associated with execution of a test against a software application, the baseline test report comprising a plurality of test steps;
receiving, by the computing device, a recent test report associated with execution of a test against the software application, the recent test report comprising a plurality of test steps;
matching, by the computing device, each test step of the baseline test report to a corresponding test step of the recent test report;
for each pair of matched test steps:
comparing, by the computing device, a first user interface screenshot captured during execution of the test step of the baseline test report to a second user interface screenshot captured during execution of the test step of the recent test report;
determining, by the computing device, one or more differences between the first user interface screenshot and the second user interface screenshot;
generating, by the computing device, a differential image based upon the one or more differences between the first user interface screenshot and the second user interface screenshot; and
storing, by the computing device, the differential image in a data store.

12. The method of claim 11, wherein matching each test step of the baseline test report with a corresponding test step of the recent test report comprises:

converting each test step of the baseline test report into one or more objects;
converting each test step of the recent test report into one or more objects; and
comparing the objects for each test step of the baseline test report to the corresponding objects for each test step of the recent test report.

13. The method of claim 12, wherein the computing device generates a screenshot map based upon the object comparison.

14. The method of claim 11, wherein comparing a first user interface screenshot captured during execution of the test step of the baseline test report to a second user interface screenshot captured during execution of the test step of the recent test report comprises:
comparing each pixel of the first user interface screenshot to a corresponding pixel of the second user interface screenshot.

15. The method of claim 14, wherein comparing each pixel of the first user interface screenshot to a corresponding pixel of the second user interface screenshot comprises:
comparing a color value of the pixel of the first user interface screenshot to a color value of the corresponding pixel of the second user interface screenshot.

16. The method of claim 15, wherein comparing each pixel of the first user interface screenshot to a corresponding pixel of the second user interface screenshot comprises:
comparing a location of the pixel of the first user interface screenshot to a location of the corresponding pixel of the second user interface screenshot.

17. The method of claim 16, wherein determining one or more differences between the first user interface screenshot and the second user interface screenshot comprises:
identifying one or more pixels in the second user interface screenshot where the color value does not match the color value of the corresponding pixel in the first user interface screenshot.

18. The method of claim 17, wherein the computing device generates the differential image when a count of the identified pixels in the second user interface screenshot is above a predetermined threshold.

19. The method of claim 17, wherein the computing device does not generate the differential image when a count of the identified pixels in the second user interface screenshot is at or below a predetermined threshold.

20. The method of claim 11, wherein the differential image comprises one or more highlighted areas corresponding to the one or more differences between the first user interface screenshot and the second user interface screenshot.

* * * * *